United States Patent [19]

Chen

[11] Patent Number: 5,180,237
[45] Date of Patent: Jan. 19, 1993

[54] KEYBOARD FOR UNDER WATER USE

[75] Inventor: Yen-Chin Chen, Hsinchu, Taiwan

[73] Assignee: Getac Corporation, Hsinchu, Taiwan

[21] Appl. No.: 902,711

[22] Filed: Jun. 23, 1992

[51] Int. Cl.$^5$ ................................................ B41J 5/16
[52] U.S. Cl. ..................................... 400/479; 400/719
[58] Field of Search ....................... 400/479, 713, 719; 200/302.2

[56] References Cited

U.S. PATENT DOCUMENTS

| | | | |
|---|---|---|---|
| 3,890,480 | 6/1975 | Berling et al. | 400/479 |
| 4,322,587 | 3/1982 | Burns et al. | 200/302.2 |
| 4,644,326 | 2/1987 | Villalobos et al. | 200/302.2 |
| 5,089,671 | 2/1992 | Ranetkins | 200/302.2 |

FOREIGN PATENT DOCUMENTS

| | | | |
|---|---|---|---|
| 0240129 | 11/1987 | European Pat. Off. | 200/302.2 |
| 2082122 | 3/1982 | United Kingdom | 400/479 |
| 2086804 | 5/1982 | United Kingdom | 400/479 |

*Primary Examiner*—Edgar S. Burr
*Assistant Examiner*—Anthony H. Nguyen
*Attorney, Agent, or Firm*—Christensen, O'Connor, Johnson & Kindness

[57] ABSTRACT

A keyboard housing includes a key plate with a plurality of actuator keys mounted on an upper face and a waterproof chamber mounted on a lower face thereof and a device to retain the actuator keys in a normally unpressed position. A circuit board is disposed in the waterproof chamber. A switch contact assembly mounted on the lower face of the key plate which includes a first membrane having a first conductive pattern, a second membrane having a second conductive pattern and a partition membrane disposed between the first and second membranes to separate the first conductive pattern from the second conductive pattern in a normal open switch. The partition membrane includes a hole device which permits a portion of the first conductive pattern to engage with a portion of the second conductive pattern when the first membrane is pressed by one of the actuator keys, thereby generating a signal corresponding to the pressing key. The periphery of the first membrane is adhesively connected to a face of the partition membrane, and the periphery of the second membrane is adhesively connected to the other face of the partition membrane. The conductive patterns of the first and second membranes are electrically connected to the circuit board.

2 Claims, 3 Drawing Sheets

KEYBOARD FOR UNDER WATER USE

BACKGROUND OF THE INVENTION

1. Field of Invention

This invention relates to a keyboard, more particularly to a keyboard of a computer which can be operated under water.

2. Description of The Related Art

A keyboard of a computer is operated generally in a dry environment, and therefore, the keyboard casing is provided with a water proof device. Once water is spilled on the casing or when the casing is immersed in water, the keyboard can not be operated. The reason is very simple. The electric circuit and the conductive means are short circuited by water, rendering the keyboard useless.

SUMMARY OF THE INVENTION

A main object of the present invention is to provide a keyboard incorporated in a computer, which keyboard can be operated in open air as well as in water.

According to the present invention, a keyboard housing includes a key plate with a plurality of actuator keys on an upper face and a means for retaining the actuator keys in a normally unpressed position. A water tight compartment is disposed on a lower face of the key plate. The contact switch assembly includes a circuit board disposed in the water tight compartment, a first membrane layer having a conductive pattern thereon, a second membrane layer having a second conductive pattern thereon, and a partition layer disposed between the first and second membrane layers for separating the first conductive pattern from the second conductive pattern in a normal open switch. The partition membrane has a hole means which permits a portion of the first conductive pattern to engage with a portion of the second conductive pattern when the first membrane layer is pressed by one of the actuator keys so as to generate a signal corresponding to the pressing key. The peripheries of the first and second membrane layers are bonded to both sides of the partition membrane by applying adhesive and then pressing the membranes against one another by means of a screen printing method so that the interfaces between the membranes are water-proof. The circuit board and the conductive patterns are electrically connected by a cable means.

BRIEF DESCRIPTION OF THE DRAWINGS

Other features and advantages of the present invention will become more apparent in the following detailed description, including drawings, all of which show a non-limiting form of the present invention, and in which.

DETAILED DESCRIPTION OF THE PREFERRED EMBODIMENT

Figure 1:
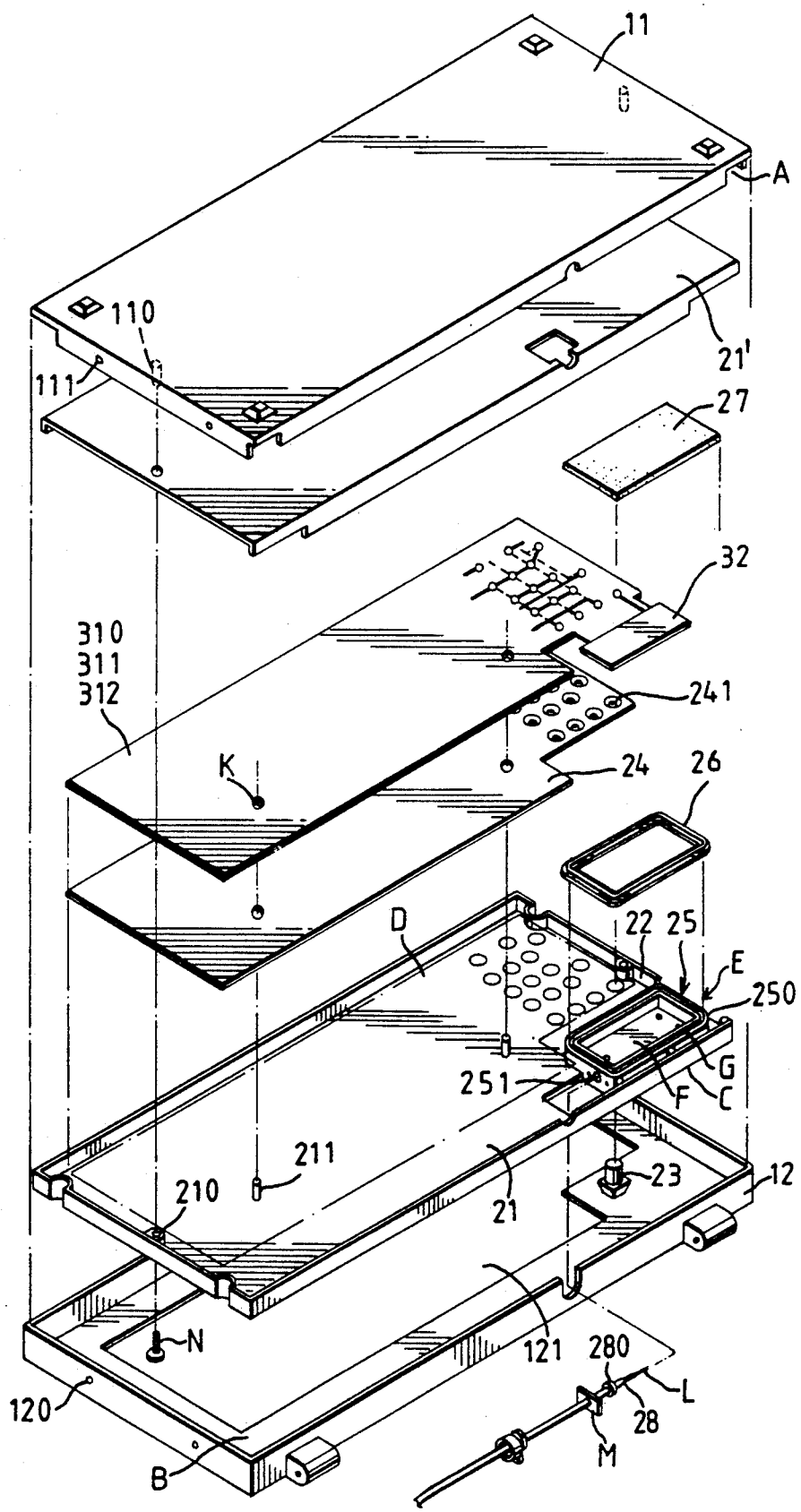
FIG. 1 shows an exploded view of a keyboard in an inverted position. That is, the tops of the keys face towards the bottom of the page. The keyboard can be operated under water according to the present invention.

Referring to FIG. 1, a keyboard for a computer according to the present invention includes a keyboard housing (11, 12), a key assembly (21, 21') and a switch contact assembly.

The housing includes a lower portion (11) with a substantial depth defining a receiving space (A) therein, with a plurality of engaging projections (110) formed on a bottom thereof and a plurality of mounting holes (111) provided around the periphery of the same, and an upper portion (12) adapted to cover the lower portion (11) and having an upper lid (B) with an opening (121) and a plurality of mounting holes (120) correspondingly aligned with the mounting holes (111) of the lower portion so that locking screws can pass therethrough to secure the two portions.

The key assembly includes a base plate (21') provided on the lower portion (11), and a key plate (21) is disposed on the base plate (22) and has a plurality of actuator keys (23) extending out from the opening (121) of the upper lid (B). A resilient plate (24) is disposed under the key plate (21) and has a plurality of resilient projections (241) respectively abutting against the corresponding actuator keys (23) so as to retain the actuator keys in an unpressed position at the normal condition. The key plate (21) also has a plurality of engaging grooves (210) for receiving the projections (110) of the lower portion (11).

The key plate (21) also has a chamber (25) on a lower face thereof and provided at a corner (E), which chamber defines a receiving space (F) therein. The upper section (250) of the chamber (25) has a rectangular recess (G) to receive a rubber seal ring (26). When the upper section of the chamber is covered by a covering member (27), a water proof chamber is obtained. A side wall of the chamber is cut to possess an opening (251), which gradually enlarges outward.

Figure 3:
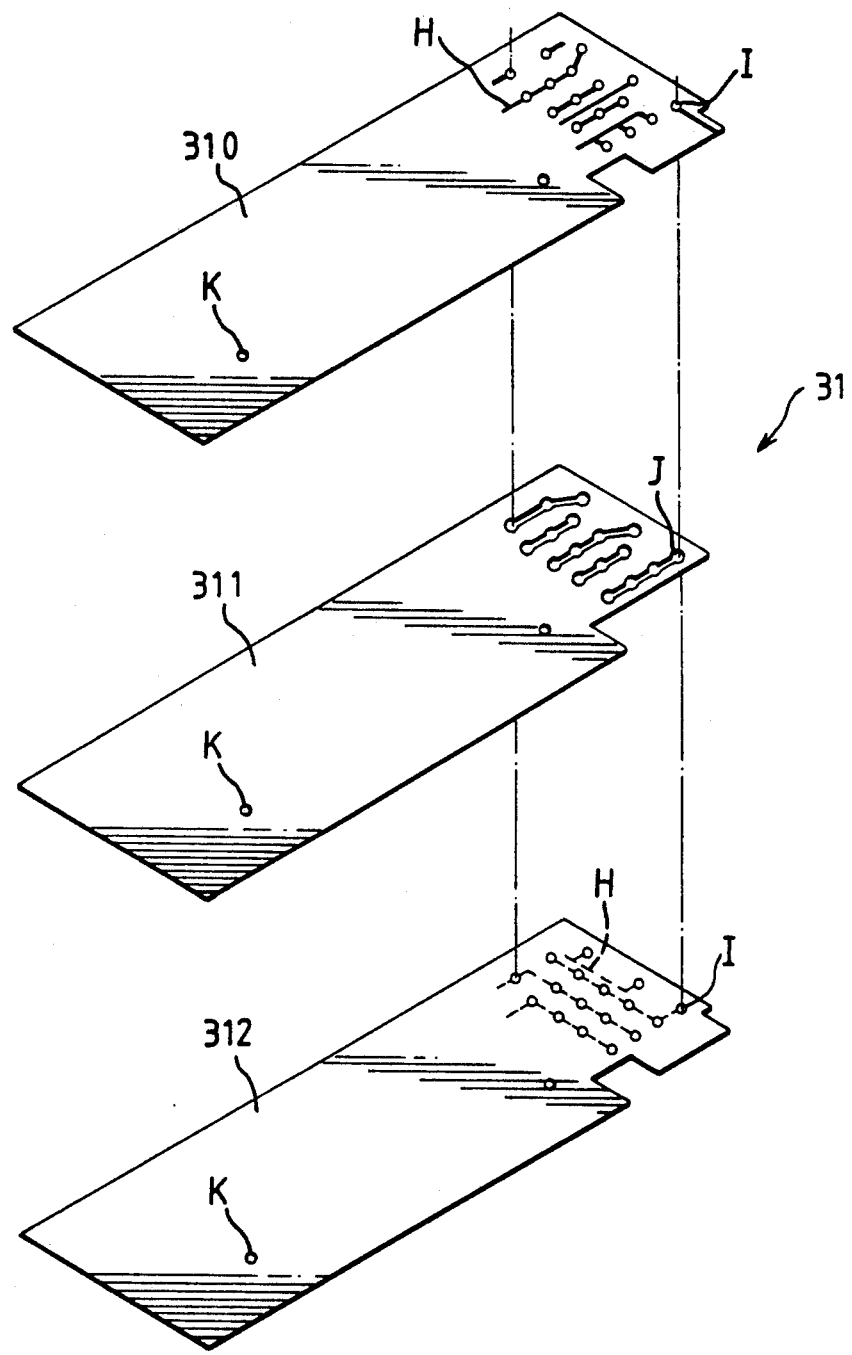
FIG. 3 shows an exploded view of a switch contact assembly employed in the keyboard of the present invention.

The switch contact assembly includes a circuit board (32) disposed in the water proof chamber (25) and electrically connected to the contact assembly, referring to FIG. 3, that includes a first membrane layer (310) having a first conductive pattern (H) thereon and a first contact point (I), a second membrane layer (312) having a second conductive pattern (H) and a second contact point (I) and a partition member (311) disposed between the first and second membrane layers (310, 312) for separating the first conductive pattern from the second pattern in a normally open switch. The partition membrane (311) has a through-hole (J) aligned with the first and second contact point (I) which permits the first contact point to contact with the second contact point when the first membrane layer (310), referring to FIG. 1, is pressed by one of the actuator keys (23) so as to generate a signal corresponding to the pressing key. The peripheries of the first and second membrane layers (310, 312) facing the partition membrane (311) are bonded to both faces of the partition membrane (311) by applying an adhesive on the membranes and then pressing the membranes against one another by means of a screen printing method so that the interfaces between the membrane layers are water-proof. Thus, when the bonded membranes are exposed to water, water can not seep into the conductive patterns. Each of the three membrane layers has a through-hole (K) through which a projection (211) of the key plate passes, retaining the three membranes from displacement in the keyboard housing (11, 12).

Figure 2:
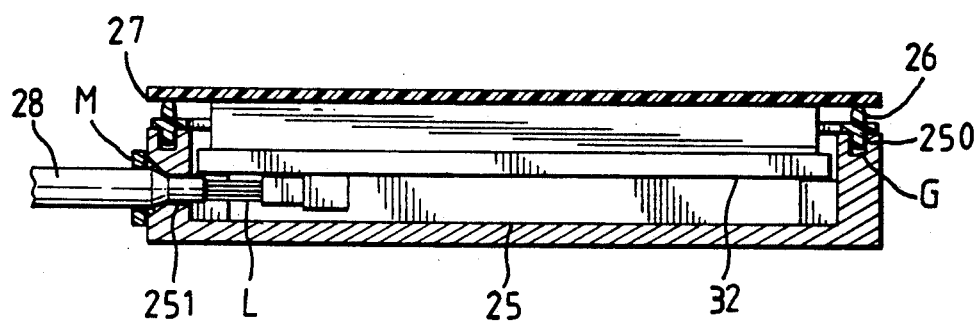
FIG. 2 shows a side view of a water proof chamber employed in the keyboard of the present invention for receiving a circuit board therein.

The conductive patterns on the first and second membrane layers are connected to the circuit board (32) in the water proof chamber (25) by a wire means (L). Referring to FIG. 2, a protective sleeve (28), made from a water-resistant insulating material, is provided at the opening (251) of the chamber (25), the wire means (L) extends through the protective sleeve. It is to be noted that the sleeve member conforms to the shape of the opening (251). A seal ring (M) is disposed around the sleeve to provide an additional seal for the opening (251) to keep the water from getting into the chamber (25).

Regarding the functions and features of the actuator keys, in which they abut against the resilient projections and thus the conducting patterns in the first and second membrane layers when the actuator key is depressed, such are known arts and are not directly concerned with the present invention. Detailed description of such is thus omitted here.

While a preferred embodiment has been illustrated and described, it will be apparent that many changes and modifications may be made in the general construction and arrangement of the present invention without departing from the spirit and scope thereof. Therefore, it is desired that the present invention be limited not to the exact disclosure but only to the extent of the appended claims.

I claim:

1. A keyboard for use under water, comprising:
a casing composed of a lower half with a bottom and an upper half including a lid with an opening;
a key plate having an upper face and a lower face provided on said bottom of said lower half and having a plurality of actuator keys formed on said upper face thereof and protruding from said opening of said lid;
means for normally retaining said plurality of actuator keys in an unpressed position;
a switch contact assembly provided on said lower face of said key plate, said switch contact assembly including a first membrane layer having a first conductive pattern, a second membrane layer having a second conductive pattern and a partition membrane disposed between said first and second membrane layers for separating said first conductive pattern from said second conductive pattern in a normally open switch, said partition membrane having a hole means which permits a portion of said first conductive pattern to engage with a portion of said second pattern when said first membrane layer is pressed by one of said actuator keys so as to generate a signal corresponding to said actuator key, the periphery of said first membrane layer being adhesively connected to a face of said partition membrane and the periphery of said second membrane layer being adhesively connected to another face of said partition membrane, said key plate further including a water tight compartment formed on said lower face thereof and having a circuit board therein;
said water tight compartment further including an opening;
a cable means having one end connected to said conductive patterns of said adhesively bonded membrane layers and another end of which extends through said opening to connect with said-circuit board; and
a sealing member provided around said opening of said water tight compartment to prevent water from seeping therein.

2. A keyboard as claimed in claim 1, wherein said retaining means is a resilient plate which has a plurality of resilient projections respectively abutting against said actuator keys.

* * * * *